United States Patent [19]

Hu et al.

[11] Patent Number: 5,220,661
[45] Date of Patent: Jun. 15, 1993

[54] SYSTEM AND METHOD FOR REDUCING TIMING CHANNELS IN DIGITAL DATA PROCESSING SYSTEMS

[75] Inventors: Wei-Ming Hu, Arlington; Clifford E. Kahn, Framingham; Paul A. Karger, Acton, all of Mass.; Andrew H. Mason, Hollis, N.H.; Paul T. Robinson, Arlington; John C. R. Wray, Shrewsbury, both of Mass.

[73] Assignee: Digital Equipment Corporation, Maynard, Mass.

[21] Appl. No.: 823,066

[22] Filed: Jan. 14, 1992

Related U.S. Application Data

[63] Continuation of Ser. No. 408,134, Sep. 14, 1989, abandoned.

[51] Int. Cl.$^5$ .............................................. G06F 13/00
[52] U.S. Cl. .................................. 395/550; 395/650; 395/575; 364/270; 364/270.2; 364/270.4; 364/271.8; 364/222.5; 364/286.4; 364/918.7; 364/934.3; 364/950.5; 364/DIG. 1; 364/DIG. 2
[58] Field of Search ................... 395/550, 575, 650; 364/DIG. 1

[56] References Cited

U.S. PATENT DOCUMENTS

| | | | |
|---|---|---|---|
| 4,115,867 | 9/1978 | Vladimirov et al. | 364/900 |
| 4,328,542 | 5/1982 | Anastas et al. | 364/200 |
| 4,819,164 | 4/1989 | Branson | 364/200 |
| 4,823,262 | 4/1989 | Calle | 364/200 |

OTHER PUBLICATIONS

Lipner; A Comment On The Confinement Problem; The Mitre Corporation; pp. 192-196.
Cohen; A Secure Computer Network Design; Computers & Security; 4:189-205; 1985.
Girling; Covert Channels in LAN's; IEEE Transactions on Software Engineering; SE13:292-296; 1987.
Huskamp; Covert Communication channels in Timesharing Systems; Computer Science; University of California; May 1978.
Tsai; Covert-channel analysis in secure computer systems; UMI; 1987.
Lampson; A Note on the Confinement Problem; Communications of the ACM; 16:613-615; Oct. 1973.

Primary Examiner—Eddie P. Chan
Attorney, Agent, or Firm—Fish & Richardson

[57] ABSTRACT

A digital computer system for processing at least one process, said process generating operational requests for enabling selected operations. The computer system comprises a timer portion for generating two series of unpredictable timing indications. An operational processor portion is responsive to the timing indications from said timer and the operational requests for initiating operations enabled by the operational requests in response to one of the series of timing indications. The operational processor communicates with the processes regarding operations enabled with respective operational requests in response to the second series of timing indications. Since the timings of the operations by the operational processor are distinct from the timings of the communications between the operational processor and the process, the process is unable to determine timing information from the operations performed by the operational processor in response to the operational requests, thereby ensuring that the process will be unable to use the timings of the operations by the operational processor to determine timing intervals. In another aspect, the digital computer system includes a system timing generator for generating a system timing value that provides timing information. The system timing generator updates the system timing value at unpredictable intervals, but so that the system timing value provides timing information that is accurate as of the time of update. When the process requests the system timing value, the system timing generator supplies only a selected high-order portion of the system timing value, also ensuring that the process only has imprecise timing information. Since the process has access to only an imprecise system timing value, and since it is unable to use external operations, by the operational processor, for timing information, the bandwidth of any convert timing channels is reduced accordingly.

39 Claims, 9 Drawing Sheets

SYSTEM AND METHOD FOR REDUCING TIMING CHANNELS IN DIGITAL DATA PROCESSING SYSTEMS

This is a continuation of application Ser. No. 07/408,134, filed Sept. 14, 1989, now abandoned.

FIELD OF THE INVENTION

The invention relates generally to the field of digital computer systems, and more specifically to arrangements for use in such computer systems for inhibiting undesired communications between programs operating in different processes.

BACKGROUND OF THE INVENTION

A digital data processing system includes three basic elements, namely, a processor, a memory and an input/output system. The memory stores information in addressable storage locations. This information includes data and instructions for processing the data. The processor fetches information from the memory, interprets the information as either an instruction or data, processes the data in accordance with the instructions, and returns the processed data to the memory for storage therein. The input/output system control of the processor, also communicates with the memory element to transfer information, including instructions and data to be processed, to the memory, and to obtain processed data from the memory. Typically, the input/output system includes a number of diverse types of units, including video display terminals, printers, interfaces to the public telecommunications network, and secondary storage subsystems, including disk and tape storage devices.

Instructions processed by the processor are organized into one or more programs, each of which is executed in the context of a "process". A modern digital computer system typically can execute a plurality of processes concurrently. For example, a modern computer system may execute, in an interleaved fashion, a predetermined maximum number of processes each generally for selected amounts of time. At the end of a process's processing time, the computer system will stop processing that process and begin processing another process. A computer system may terminate processing of a particular process if the process, for example, requests an input/output operation, such as a transfer to or from a disk unit. Since, when a process requests such an input/output operation, the computer system typically waits until the completion of the input/output operation before it resumes processing the process that requested the input/output operation, and since an input/output operation typically can take a considerable amount of time, relative to the time required for the computer system to execute instructions, the computer switches to another process when a process that is currently executing requests an input/output operation. While, with this "multi-programming" facility, the computer system may take longer to process each individual program, since the program's process is only executed during its assigned time slots, it will be appreciated that multiprogramming does permit the computer system to process a plurality of programs in less total time, at least in part because the computer system is not stalled waiting for input/output operations to complete.

Multi-programming also provides other advantages, most notably that a number of process may share and concurrently process, in a regulated manner, data stored in shared storage devices, such as, for example, disk storage units. To enhance the security of data, that is, to reduce the likelihood that data can be read or altered by unauthorized processes, computer systems often provide extensive security facilities for regulating access to particular data files by the various processes.

However, secrecy of data in digital computer systems may be threatened by covert transmission of data between cooperating processes. For example, a process which has access to high-secrecy data may transmit the data to a process which is not authorized to read the disk files which contain the data. This may be accomplished by a "Trojan horse" in the process having access to the high-secrecy data (the "high-secrecy process") controlling various resources in the computer systems which it shares with the other process, identified as the "spy process." The "Trojan horse" is a clandestine program in the high-secrecy process which is unknown to the user of other programs in the high-secrecy process, and both it and the spy process can manipulate and observe the conditions of the shared resources. The shared resources thereby provide "channels" which can be used by the Trojan horse and the spy process to facilitate the covert transmission of high-secrecy information to the other process which would otherwise not have access to it.

Two general types of covert channels have been identified in computer systems, namely, timing channels and storage channels. Timing channels may arise as a result of the availability or unavailability of particular system resources during particular time intervals. For example, some types of instructions cause the processor to test system resources, such as interlocks, to determine whether they are set or cleared. Some such instructions may, for example, enable the processor to test the condition of an interlock to determine whether it is set, and, if not, set the interlock and perform some other operation. On the other hand, if, upon testing the condition of the interlock, the processor determines that the interlock is set, the processor stalls until the interlock is later cleared. Others of such instructions enable the processor to clear the interlock. Thus, if a program executing in one processor issues an instruction that enables the processor to set an interlock, while the interlock is set, another process executing another program will stall if it attempts to execute a similar instruction, until the interlock is cleared by the program in the first processor. A Trojan horse in one processor may thus transmit data by varying the rate at which it enables the processor to set the interlocks, and the spy process may determine the values of the data by determining the rates, at various times, at which it can concurrently enable the processor to execute instructions which would also set the interlock.

The bandwidth, that is, the rate at which a Trojan horse in one process can transmit data to a spy process is directly related to the accuracy and precision with which the processes can determine timing intervals. If both the Trojan horse and the spy process can accurately and precisely measure timing intervals, they can transmit data, using the above-described interlocked instruction mechanism, for example, at a relatively high rate. On the other hand, as the accuracy and precision with which either process can determine timing intervals diminish, so does the bandwidth of a covert timing channel.

A typical digital computer system includes a number of sources of timing information from which a process may identify the duration of a timing interval. Most notably, a typical digital computer system includes at least one system clock, that is maintained and regularly incremented by the operating system, whose value a process can obtain. Thus, on a multiprocessor, for example, a spy process on one processor may, immediately prior to beginning execution of interlocked instructions as described above, obtain the value of the system clock, thereafter begin executing the interlock instructions, and, after executing a predetermined number of the interlock instructions, obtain the value of the system clock at that point. The spy process may then determine the time interval required to process the interlocked instructions by determining the difference between the two system clock values and, from that, the value of a data bit controlled by the Trojan horse program in another processor. A timing channel is identified by the particular mechanism used by the Trojan horse to vary the rate of processing of the spy process, and a timing channel exploitation relates to the procedure of transmitting information by using one of the timing channels and one of the particular sources of timing information.

A spy process can identify a timing interval, with reference to other operations in the computer system. For example, as described above, a typical multiprogramming computer system processes a plurality of processes, which may include a spy process, in interleaved time slots. If the time slots are of predictable duration, a spy process may use the time slot itself as a time interval. In addition, a spy process can issue a series of input/output requests, such as transfers to or from mass storage subsystems, such as disk or tape storage devices, or to or from terminals, printers, or various network interfaces, which will be completed at periodic intervals. When an input/output operation initiated by a process is completed, the operating system typically interrupts it to notify it of the completion. Since the spy process initiated the input/output operations to complete at periodic intervals, the operating system will supply the interrupts at periodic intervals, and so the spy process can use the interrupts to define the timing interval.

Even if the operating system does not supply the interrupts at periodic intervals, if, for example, an input/output operation enables a disk storage subsystem to transfer data to a specified buffer, which the spy process identified in the input/output request, the spy process can iteratively test the contents of the buffer to determine when the disk storage subsystem has begun loading the data into the buffer, and determine the required interval from that. In addition, some disk storage subsystems signal completion of a storage request by generating a completion packet identifying the status of the operation and transmitting it to the process that requested the disk storage operation, and a spy process can use the timing with which it receives a series of completion packets to define timing intervals.

A process can also determine timing information in other ways. If, for example, a process issues a write request to enable a series of characters to be written to a terminal device, and follows it immediately with a cancel request, the process can identify the interval between the time the operating system initiated the write operation and the time it recognized the cancel request by reading the contents of the terminal device's screen buffer and counting the number of characters. Since a computer system transmits the characters on a periodic basis, the number of characters identifies the length of time between when the operating system began and ended character transmission.

Similarly, two processes being processed by different nodes, each comprising a computer system, over a network in a distributed digital data processing system, may determine timing of a timing interval. If one process periodically transmits characters over the network to the other process, since the network transmits characters at a periodic, and generally known, rate, the other process can derive timing information from the rate at which it receives the characters.

Many of these techniques may provide a process with timing information that may be somewhat less precise than it might obtain by obtaining the value of the system clock from the operating system, but they would all permit a spy process, executing the interlocked instructions as described above, or performing other operations whose speed can be influenced by the high-secrecy process, to obtain timing interval information that is sufficiently accurate to enable it to determine values of bits in a data stream as described above of a relatively large bandwidth.

SUMMARY OF THE INVENTION

The invention provides a new and improved digital computer system for inhibiting undesired communications between programs operating in different processes through a timing channel, by reducing the ability of a spy process to obtain accurate timing information and thereby reducing the bandwidth of a covert timing channel through which a Trojan horse in one process may transmit a digital data bit stream to a spy process.

In brief summary, in one aspect the invention provides a digital computer system for processing at least one process, said process generating operational requests for enabling selected operations. The computer system comprises a timer portion for randomly generating two series of unpredictable timing indications. An operational processor portion is responsive to the timing indications from said timer and the operational requests for initiating operations enabled by the operational requests in response to one of the series of timing indications. The operational processor communicates with the processes regarding operations enabled with respective operational requests in response to the second series of timing indications. Since the timings of the operations by the operational processor are distinct from the timings of the communications between the operational processor and the process, the process is unable to determine timing information form the operations performed by the operational processor in response to the operational requests, thereby ensuring that the process will be unable to use the timings of the operations by the operational processor to determine timing intervals.

In another aspect, the invention provides a digital computer system for processing at least one process and a system timing generator for generating a system timing value that provides timing information. The system timing generator updates the system timing value at unpredictable intervals, but so that the system timing value provides accurate timing information at the times when the system timing value is updated. When the process requests the system timing value, the system timing generator supplies only a selected high-order portion of the system timing value, so that the process only has imprecise timing information.

Since the process has access to only an imprecise system timing value updated at unpredictable intervals, and since it is unable to use external operations, by the operational processor, for timing information, the bandwidth of any covert timing channels is reduced accordingly.

BRIEF DESCRIPTION OF THE DRAWINGS

This invention is pointed out with the particularity in the appended claims. The above and further advantages of this invention may be better understood by referring to the following description taken in conjunction with the accompanying drawings in which:

DETAILED DESCRIPTION OF AN ILLUSTRATIVE EMBODIMENT

Figures 1, 3A:
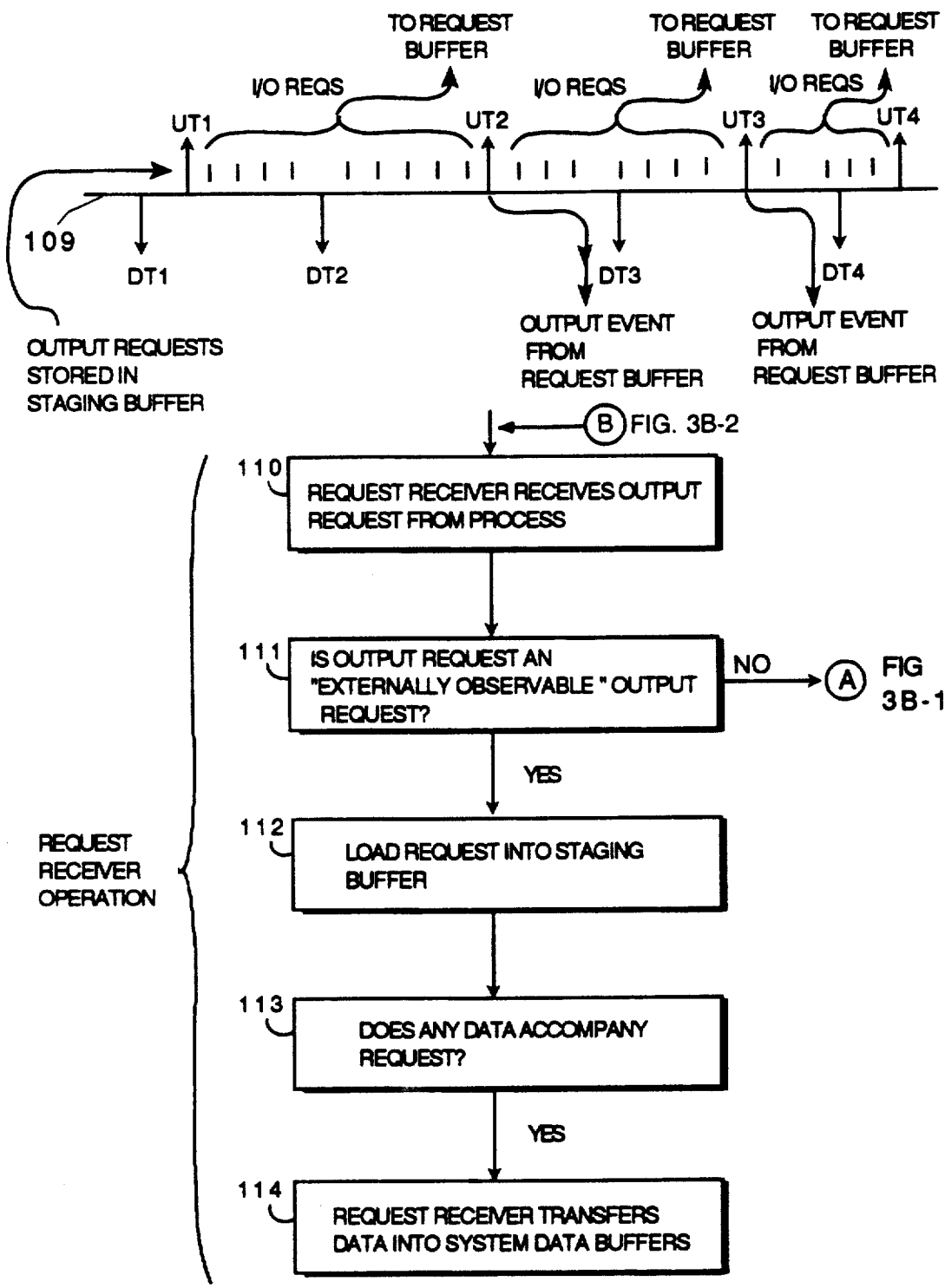
Figures 2, 3A:
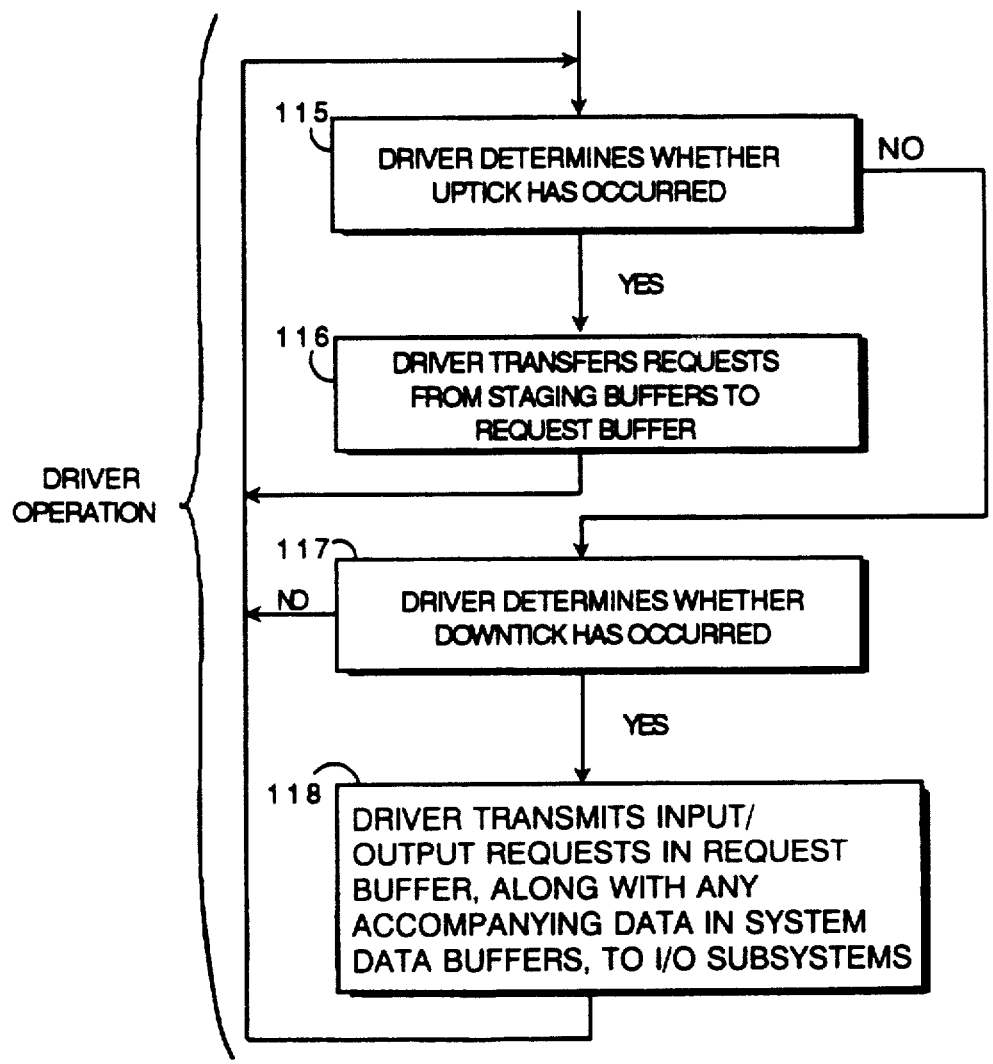

FIG. 1 depicts a functional block diagram of a digital data processing system 10 constructed in accordance with the invention. With reference to FIG. 1, the system includes a set of processes 11(1) through 11(N) (generally identified by reference numeral 11) which may be processed concurrently by processing elements (not shown) in the system 10. In one embodiment, the processing elements in system 10, such as the central processor units and other hardware which process the processes 11, are conventional and will not be described further herein.

System 10 also includes one or more input/output subsystems 12(1) through 12(M) (generally identified by reference numeral 12). The input/output subsystems include such elements of the system 10 as printers, terminal devices, interfaces to computer networks or to the public telecommunications network, and mass storage devices, such as disk and tape subsystems, that provide storage of data and instructions used in connection with processing of processes 11. The input/output subsystems 12 are also conventional and will not be described further herein.

The system 10 further includes an operating system 13, a portion of which is depicted in functional block diagram form in FIG. 1. The portion of operating system 13 depicted in FIG. 1 includes elements for performing three general types of operations, including (1) timing value generation, by a timer portion 16, (2) process scheduling, by a process scheduler 14, and (3) input/output interfacing, in an input/output interface portion 17. In accordance with the invention, the operating system 13 reduces the bandwidth of a timing channel through which a Trojan horse in one process 11 may transmit a stream of digital data bits to another spy process 11 by effectively reducing the accuracy with which at least the spy process may determine a timing interval. The operating system 13, specifically the time portion 16, process scheduler 14 and input/output interface 17, implements several techniques to reduce the accuracy of timing information which a spy process 11 may be able to discern, as described below.

The timer portion 16 generates timing values and timing indications which are used in controlling operation of other portions as described below. In particular, the timer portion 16 generates (1) a system time value, (2) an UP TICK indication and (3) a DOWN TICK indication. The system time value may be used by various elements of the system 10 to identify, to a predetermined degree of accuracy, an absolute time and time intervals. The UP TICK and DOWN TICK indications are used to control various elements of the operating system 13 to decrease the ability of the processes 11 to identify precise time intervals. Generally, the UP TICK indications control timing of processing by the various processes 11 and transmission of notifications of events to the processes 11, and the DOWN TICK indications control the timing of operations with the input/output subsystems 12. Since the intervals between UP TICK and DOWN TICK indications are generally unpredictable, the processes 11 are unable to determine precise timing of operations of the input/output subsystems 12, and thus are unable to deduce timing information therefrom.

The UP TICK and DOWN TICK indications are generated, generally on an interleaved basis, in the timer portion 16 by a tick counter 30 and a tick selector 31. The tick selector 31 actually generates the UP TICK and DOWN TICK indications. The tick counter 30, when it counts out, is loaded with a pseudo-random, unpredictable number from a random number store 32, and decremented in response to a CTR TICK counter tick signal generated, for example, by a precise timing source. When the tick counter 30 times out, it generates a TICK indication, which, in turn, enables the tick selector 31 to terminate generating the indication it is then generating and begin generating the other indication. That is, if the tick selector 31 is generating the UP TICK indication, in response to a TICK indication it begins generating the DOWN TICK indication. On the other hand, if the tick selector is generating the DOWN TICK indication, in response to a TICK indication from the counter 30 it begins generating the UP TICK indication. In addition, the UP TICK and DOWN TICK indications enable a system time generator 33 to generate a new system time value, which is effectively the sum of the random number which was loaded into the counter 30 and the previous system time value, which summing operation is represented by an adder element 34.

Thus, while the CTR TICK counter tick signals are periodic, and the system time value generated by the system time generator 33 is updated accurately, since it is only updated on an unpredictable basis when the counter times out, the times at which the system time generator updates the system time value are unpredictable. Furthermore, since the timing of the updates is unpredictable, they cannot be used to identify precise timing intervals. As a further defense to the covert timing channels, the timer 16, when required to give a process 11 a system time value, provides only a high-order portion thereof, in one embodiment sufficient to provide a precision of 0.1 seconds. Since the bandwidth of a covert timing channel exploitation using the system time value information increases with the precision of the system time value information provided by the timer portion 16 to the processes 11, and since the precision is relatively low, any covert timing channel exploitation using the system time value information also has a correspondingly low bandwidth. It will be appreciated that, since the precision of the system time value available to the processes affects the bandwidth of the timing channel exploitation using the system time value, the particular precision selected may vary depending on the required bandwidth.

In the same embodiment, the time interval between both two successive UP TICK indications and two successive DOWN TICK indications averages twenty milliseconds, and the time interval between an UP TICK indication and a successive DOWN TICK indication averages ten milliseconds in a computer system including a single processor (not shown). It will be appreciated that, since the degree of randomness of the UP TICK and DOWN TICK indications affects the bandwidth of the timing channel using timing information from shared system resources, the particular range of unpredictability that is selected may vary depending on the required bandwidth.

Further, in a computer system including multiple processors for executing processes 11 and operating system 13, each processor separately generates UP TICK indications for controlling other portions of the operating system 13 it is processing as described below, and thus each processor includes an up tick counter 30 for generating the UP TICK indication. In addition, each processor has a random number generator 35 for supplying unpredictable random numbers to its up tick counter 30, which random numbers may, at any particular time, be different from the random numbers contemporaneously generated by random number generators 35 processed by other processors in the system. In that same embodiment, in a computer system having multiple processors, one processor generates DOWN TICK indications and broadcasts them to the other processors. It will be appreciated that, in that multiple processor embodiment, the UP TICK indications generated by a processor and DOWN TICK indications which it may receive may not be in interleaved form.

The timer portion 16 may use any mechanism for generating unpredictable random numbers for the random number store. In one embodiment, the timer portion 16 includes a three-stage random number generator 35 to generate the unpredictable random numbers. In particular, the random number generator 35 includes an initial stage 36 which generates random numbers according to well known Data Encryption Standard algorithms. Each random number generated by the stage 36 operates as a seed for the second stage 37, which generates random numbers according to well-known linear feedback shift-register algorithms. Further, each random number generated by the stage 37 operates as a seed for the third stage 38, which generates random numbers according to well-known multiplicative congruential generator algorithms. Finally, the random numbers produced by the stage 38 are coupled, through random number store 32, for use in the counter 30, as described above. Since the Data Encryption Standard random number generation algorithm usually requires longer to process than the linear feedback shift-register algorithm, the Data Encryption Standard random number generation algorithm is used only periodically to generate a random number to be used as a seed value in the linear feedback shift register algorithm. Similarly, since the linear feedback shift register algorithm requires more processing time than a multiplicative congruential generator algorithm, the linear feedback shift register algorithm is used only periodically to generate a random number used as a seed value in the multiplicative congruential generator algorithm.

The process scheduler 14 schedules and times execution of the various processes 11, which are identified in a process ready queue 15. In response to an UP TICK indication from timer 16, if the process ready queue 15 identifies any processes 11 other than the process currently executing, the process scheduler 14 performs a context switch operation, in a conventional manner, to enable a next process, as identified in the process ready queue 15, to be processed. Thus, the process scheduler 14 enables context switches for the various processes 11 identified in the process ready queue 15 at every UP TICK indication, and, since intervals between UP TICK indications are of unpredictable duration, as determined by the counter 30, a spy process 11 cannot use the duration of its processing interval as a timing interval for a covert timing channel exploitation.

It will be appreciated that, if the process ready queue 15 is empty, the process scheduler 14 will allow that process 11 (the process then being processed) to continue processing through the next processing interval. In any event, since the durations of all of the processing intervals are unpredictable, a spy process cannot use the duration of any sequence of processing intervals as a timing interval for a covert timing channel.

It will be further appreciated that a process 11 may voluntarily suspend its execution. In that case, in one embodiment, if the process ready queue 15 identifies additional processes 11 to be executed, the process scheduler 14 enables the first process 11 identified in the process ready queue to be processed. At that time, the timer 16 also enables the system time value to be updated. Alternatively, the process scheduler 14 may delay initiating processing of another process 11 until the next UP TICK indication, in which case the processor will be idle from the time the process 11 suspends itself until the next UP TICK indication. In either case, a spy process will be unable to accurately determine the duration of a processing interval as a timing interval for a covert timing channel exploitation.

Thus, the time portion 16 and the process scheduler 14 reduce the ability of the spy process 11 to determine accurate timing information by, respectively, reducing the precision of the system timing value that is supplied to the spy process 11, and by reducing the predictability of the timing of the duration of the spy process's processing interval. Thus, both the timer portion 16 and process scheduler 14 reduce the ability of the spy process 11 to determine timing information from occurrences within the processor that is processing the spy process 11.

As noted above, the operating system 13 also includes an input/output interface portion 17. The input/output interface portion 17 is structured to reduce the ability of a spy process 11, or several cooperating processes on one or more processors, to determine accurate timing information with reference to occurrences external to the processor that is processing the spy process 11 controlled by the spy process 11. This is accomplished in several ways. In connection with input/output operations whose interim progress may be observable, that is, those requests which initiate operations which may thereafter be modified before completion, the transmissions are delayed until a time which is not observable by the spy process 11, in particular, delayed to a DOWN TICK indication. Thus, for example, if the spy process 11 interleaves execution of interlocked instructions, whose rate may be influenced by a Trojan horse as described above, with input/output requests to transmits characters to an input/output subsystem 12 comprising a terminal device, for a predetermined number of characters, followed by a cancellation operation to cancel outstanding input/output requests which have not been transmitted, the spy process 11 can determine the number of characters actually transmitted to the terminal device by reading the terminal device's storage buffer. The number of characters in the terminal device's storage buffer identifies the time at which the cancellation operation took effect, which, in turn, provides information as to the number of interlocked instructions executed by the spy process 11 during a processing interval, which indicates whether the Trojan horse was delaying processing of the spy process by executing interlocked instructions itself.

To minimize this, the input/output interface portion 17 delays issuance of input/output requests whose interim progress is observable and transmits all of them at each DOWN TICK indication, as noted above. Since the timing of the DOWN TICK indications is unpredictable in relation to the timing of the UP TICK indications, which define the processing intervals for the processes 11 and thus the intervals in which the spy process actually transmits the input/output requests, the numbers of input/output requests transmitted at any DOWN TICK indication need bear no relation to the numbers of input/output requests that a spy process 11 may generate between two UP TICK indications.

On the other hand, in connection with an input/output request which is externally observable, such as by a cooperating process executing in another processor which communicates with the spy process over a network link, the input/output interface portion 17 buffers input/output requests by a process 1 between UP TICK indications and transmits them at the next DOWN TICK indication. Thus, for example, if the spy process 11 interleaves execution of interlocked instructions, whose rate may be influenced by a Trojan horse as described above, with input/output requests to transmit characters to an input/output subsystem 12 comprising a network interface, if the input/output requests are just buffered to each DOWN TICK indication, the cooperating process 11 can determine the number of characters actually transmitted to the network interface by the numbers of characters it receives at each DOWN TICK indication. With the timing of the DOWN TICK indication and the numbers of characters received, the cooperating process can determine whether the Trojan horse was delaying processing of the spy process by executing interlocked instructions itself.

To minimize this, the input/output interface portion 17 delays issuance of externally-observable input/output requests between successive UP TICK indications and transmits them at the next DOWN TICK indication, as noted above. Since the timing of the DOWN TICK indications is unpredictable in relation to the timing of the UP TICK indications, the numbers of characters transmitted at any DOWN TICK indication has no relation to the interval between DOWN TICK indications and rate of transmission of input/output requests by the spy process 11.

Finally, if the input/output request is such that it is not externally observable by a cooperating process, and if its interim progress is not observable, such as typically the case with mass storage devices such as disk or tape storage devices, the input/output interface portion 17 need not delay the input/output request, but instead may transmit the input/output request to the input/output subsystem 12 upon receipt.

In addition, the input/output interface portion 17 isolates the processes 11 from the timings with which the input/output subsystems 12 complete or respond to input/output operations initiated by input/output requests, thereby isolating the processes from timing information which may otherwise be provided by the input/output subsystem 12. In particular, the input/output interface portion 17 batches input/output responses or completion indications from the input/output subsystems which it receives up to a preceding DOWN TICK indication, and provides it to a process 11 executing at the next UP TICK indication. Thus, the timing with which the input/output interface portion 17 receives a response or completion indication may bear no relation to the time with which it is presented to the process 11.

Thus, the input/output interface portion 17 receives input/output requests from the processes 11, controls timing with which the input/output subsystems 12 perform input/output operations, and further controls the timing which the results of the input/output operations are reported to the processes 11. To accomplish these operations, the input/output interface portion 17 includes a request receiver 20 that receives input/output requests from the various processes 11, generally from an application, generally identified by reference numeral 21, operating in the context of the process 11. The request receiver 20 thereafter loads the request into a request buffer 23, if the input/output request is one, such as a request to transfer data to a terminal device, whose interim progress may be observable. On the other hand, if the input/output request is one, such as a request to transmit data through a network line interface, which is externally observable, the request receiver 20 loads the request into one of a plurality of staging buffers 28(1) through 28(N) [generally identified by the reference numeral 28($i$)], associated with the particular process 11($i$) which issued the request. Finally, if the input/output request is one, such as to a mass storage device, which is neither externally observable, and whose interim progress is not observable, the request receiver may transmit the request directly to an appropriate one of drivers 25($l$) through 25($k$) (generally identified by reference numeral 25) for processing as described below.

As is conventional, an input/output request may initiate several types of operations in input/output subsystem 12, including transmission of data to an input/output subsystem 12, retrieval of data from an input/output subsystem 12, or cancellation of an operation previously initiated by an input/output request. If the request is to initiate the transfer of data to an input/output subsystem 12, the request receiver 20 contemporaneously enables the contents of the process's process buffer, generally identified by reference numeral 22, containing the data to be transferred to a system data buffer 24.

As described above, the input/output interface portion 17 also includes one or more input/output drivers 25. The drivers 25 transmit input/output requests, either those input/output request which the request receiver 20 has transmitted directly thereto, or those which the request receiver 20 has stored in a request buffer 23, to the various input/output subsystems 12, and receive responses therefrom indicating their status in executing the requests. The input/output interface portion 17 includes one driver 25 for each of the diverse types of input/output subsystems 12 in the system 10. As is conventional, a system 10 may comprise several diverse types of input/output subsystems 12, and the diverse types of subsystems 12 may have different protocols by which they receive input/output request rom the input-/output interface portion 17 and by which they transmit responses thereto, and each input/output driver 25 transmits requests to and receives responses from the input/output subsystems 12 of the type which it supports.

For those drivers 25 associated with an input/output subsystems 12 whose operation is not externally observable and whose interim progress is not observable, the drivers 25 receive the input/output requests from the request receiver 20 and may proceed to issue them to the respective input/output subsystems 12 immediately, without relation to an UP TICK indication or a DOWN TICK indication. The operations of the other drivers 25, however, are generally in relation to the DOWN TICK indications and, in some cases, the UP TICK indication. More specifically, upon receipt of an UP TICK indication, the drivers 25 associated with input-/output subsystems 12, such as network line interfaces, whose operation is externally observable, transfer requests from the staging buffers 28 to the request buffer 23. In addition, upon receipt of each DOWN TICK indication from the timer 16, the input/output drivers 25 associated with the input/output subsystems 12 whose operations are externally observable or whose interim progress is observable, transmit the input/output requests, which were buffered in the request buffer 23 prior to the DOWN TICK indication, to the respective input/output subsystem 12.

If the input/output request is directed to an input/output subsystem 12, such as a terminal device or network line interface, whose operation is externally observable or whose interim progress is observable, the input/output request will include data, from the system data buffers 24, which were provided to the request receiver 20 with the input/output request. Similarly, if the input/output request is directed to an input/output subsystem 12, such as a mass storage device, whose operation is not externally observable and whose interim progress is not observable, the input/output request transmitted by the respective driver 25 may identify data, in system data buffers 24, to be retrieved by the input/output subsystem 12, or alternatively it may identify a location in system data buffers 24 into which the input/output subsystem 12 is to load data. If enabled by an input/output request, the input/output subsystem 12 retrieves the data from the system data buffer 24, performs the required operation, such as to obtain data from an identified buffer in system data buffers 24 and store it on, for example, a disk. After completing the operation, the input/output subsystem 12 notifies the driver 25, by means of, for example, a completion packet.

On the other hand, if enabled by an input/output request from the driver 25, an input/output subsystem 12 performs a required operation to retrieve the data from a source such as disk, and load it into a system data buffer 24(i) identified in the request, which is associated with the particular process 11(i) which issued the input-/output request. After finishing the input/output operation enabled by the input/output request, the input/output subsystem 12 notifies the driver 25 by means of a completion packet, which it stores in the system completion packet queue 26.

After receiving a completion packet from an input-/output subsystem 12, the driver stores the completion packet in the system completion packet queue 26. The completion packet contains such information as the identification of the process which initiated the operation, the status of the operation, and, if the operation enabled the input/output subsystem 12 to transfer information to a system data buffer 24, a pointer to the system data buffer 24 in which the data is located. The driver 25, in turn, links the completion packet in the system completion packet queue 26.

When a DOWN TICK indication occurs, the drivers 25 transfer the contents of the system completion packet queue 26 to a set of per-process completion packet queues 52(l) through 52(N) (generally identified by reference numeral 52), with each per-process completion packet queue 52(i) being associated with each process 11(i). The drivers 25 essentially unlink each separate completion packet in the system completion packet queue 26, identify, from the process identification in the completion packet, the process to receive the completion packet, and link the packet to the process's queue in the per-process completion packet queue.

The interface 17 also includes two other data structures, namely, a completion bit vector 50 and a set of per-process bit vectors 51(l) through 51(N) (generally identified by reference numeral 51). The completion bit vector includes a set of bits, or flags, each associated with one of the process being processed by the system 10. When a driver 25 loads a completion packet into a process's completion packet queue in queues 52, it sets the process's bit in the completion bit vector 50, thereby indicating that the process's completion packet queue is not empty, that is, that it has at least one completion packet therein. Each process's bit vector in the per-process bit vectors also includes a set of bits, or flags, each associated with a type of input/output operation. When a driver 25 links a completion packet into a process's completion queue in queues 52, it sets the bit in the process's bit vector in bit vectors 51 to identify the types of operations to which the completion packet responds.

If, on the other hand, the input/output subsystem 12 is, for example, a terminal or a printer, that is not a direct memory access device, the drivers 25 may establish interfaces, which in one embodiment comprise conventional input and output ring buffers. In response to a DOWN TICK indication, the respective drivers 25 load the input/output requests for such subsystems 12 from the request buffer 23 into the corresponding output ring buffers, from which they are transmitted to the respective input/output subsystems. In addition, the input-/output subsystems may load requests into the input ring buffers for transmission to the various processes 11. In response to a DOWN TICK indication, the respective drivers load the requests in the input ring buffers into data structures similar to the per-process completion packet queues 52, for buffering before transmission to the processes. In addition, the drivers condition the respective bits of the completion bit vector 50 and the respective processes' per-process bit vector 51.

The input/output interface portion 17 also includes an event notifier portion 27 that notifies each of the processes 11, of the receipt of completion packets from input/output subsystems 12 responding to their respective input/output requests, or of the receipt of requests through the input ring buffers. In particular, upon receipt of each UP TICK indication from the timer 16, the event notifier portion 27 transfers, to the process 11 that the system 10 is then processing, the completion packet queue, from per-process completion packet queues 52, and requests received through the input ring buffers. Since a process 11 receives queued completion packets or requests only once, when it begins its processing, rather than when the completion packets are actually received by the drivers 25, the number of times the process 11 is interrupted may be reduced, which can improve processing efficiency.

As the event notifier 27 transmits a process's completion packet queue to a process 11, it also transmits any data in the system data buffers 24 associated therewith to the process 11. In this operation, the event notifier loads the data from the system data buffers 24, as identified by pointers in the completion packets, into the processes' process buffers 22.

Since the timer portion, (1) provides the processes 11 with imprecise system timing value information, and (2) enables the system time generator to update the system time value at unpredictable intervals, and (3) generates at unpredictable and asynchronous times the UP TICK and DOWN TICK indications, which the process scheduler 14 and input/output interface portion 17 use to, respectively, control scheduling and reporting to the processes 11 and control initiation of operations by the input/output subsystems, the processes 11 may be effectively unable to determine timing information sufficiently precise as to be able to provide more than a low-bandwidth covert timing channel.

More specifically, a spy process 11 may be able to determine a time interval by determining the difference between two system clock values at the beginning and end of a series of, for example, interlocked instructions and, from that, the value of a data bit controlled by the Trojan horse program in the other process. However, since the system clock value provided to the spy process 11 is updated unpredictably and has relatively low precision, the Trojan horse would have to maintain the interlock set for a long period, and the spy process 11 would have to execute long series of interlocked instructions during that period, to transfer a single data bit, thereby effectively reducing the bandwidth of a covert timing channel exploitation using the system time value as a clock.

Similarly, since the time slots during which the various processes 11 are executed, which is controlled by the process scheduler 14, are of randomly-varying durations, timing information a spy process might derive therefrom would also be randomly varying and, thus, imprecise. Accordingly, any covert timing channel exploitation deduced therefrom would be of relatively low bandwidth.

In addition, since the timing of operations between the input/output interface portion 17 of the operating system 13 and the input/output subsystems 12, which are controlled by the DOWN TICK indication, is asynchronous and unpredictable with respect to the timing of operations between the input/output interface portion 17 and the processes 11, which are controlled by the UP TICK indication, the processes 11 are unable to determine precise timing information from input/output operations which they may initiate.

FIGS. 2 through 4B contain flow charts depicting operations performed by various elements of the operating system 13 depicted in FIG. 1 in connection with the UP TICK and DOWN TICK indications as described above, as well as time lines that may assist in understanding the operations.

Figure 1A:
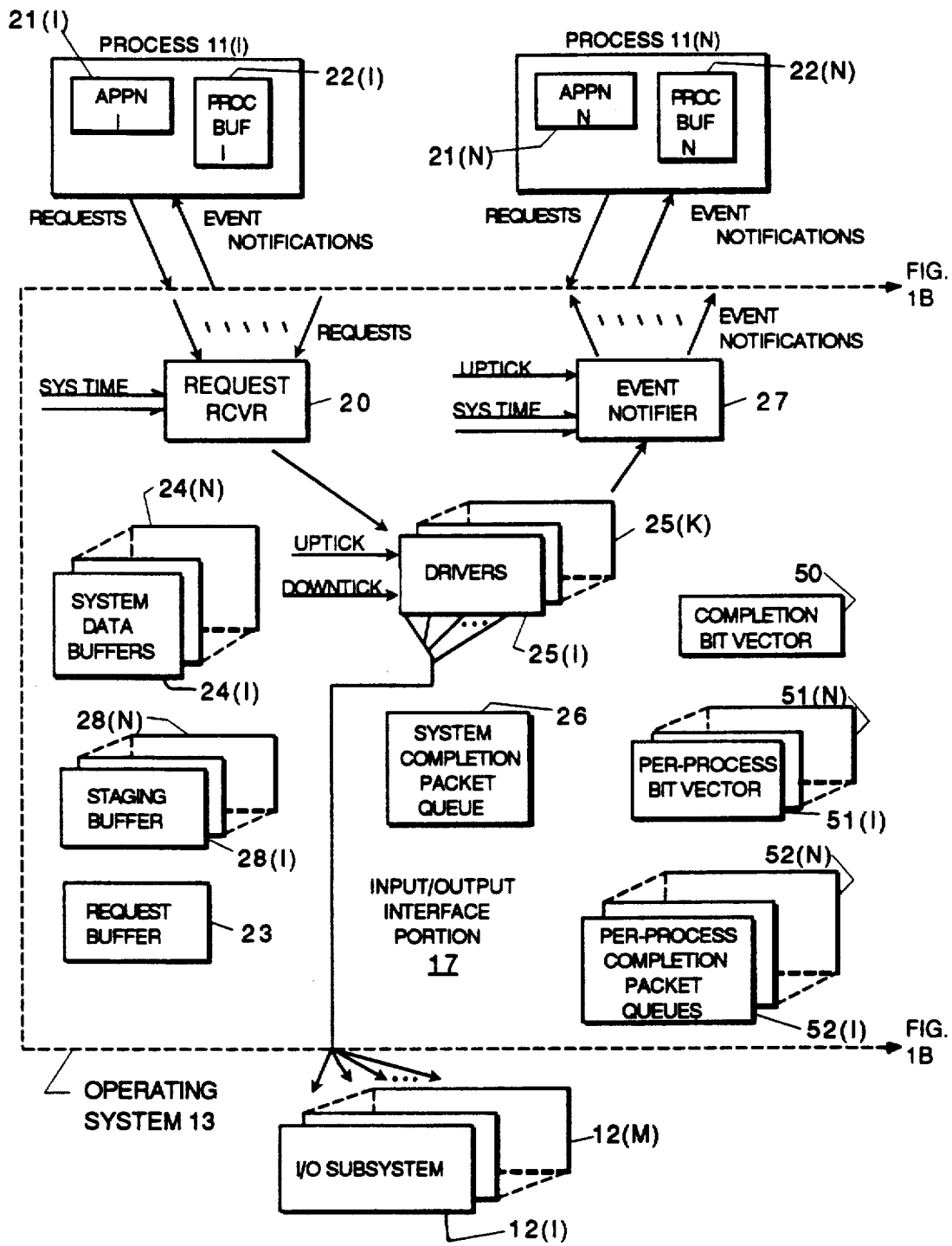
FIGS. 1A and 1B are functional block diagrams of a digital data processing system constructed in accordance with the invention.
Figure 1B:
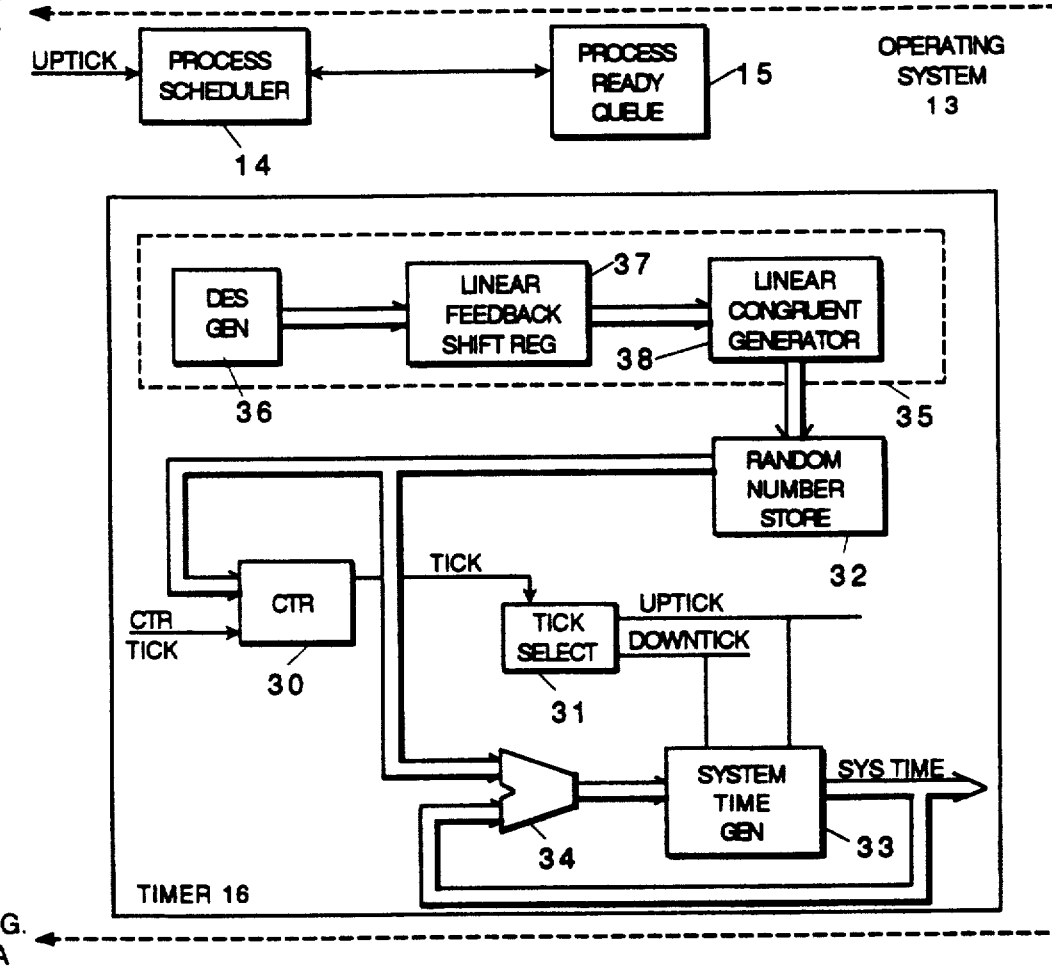
Figure 2:
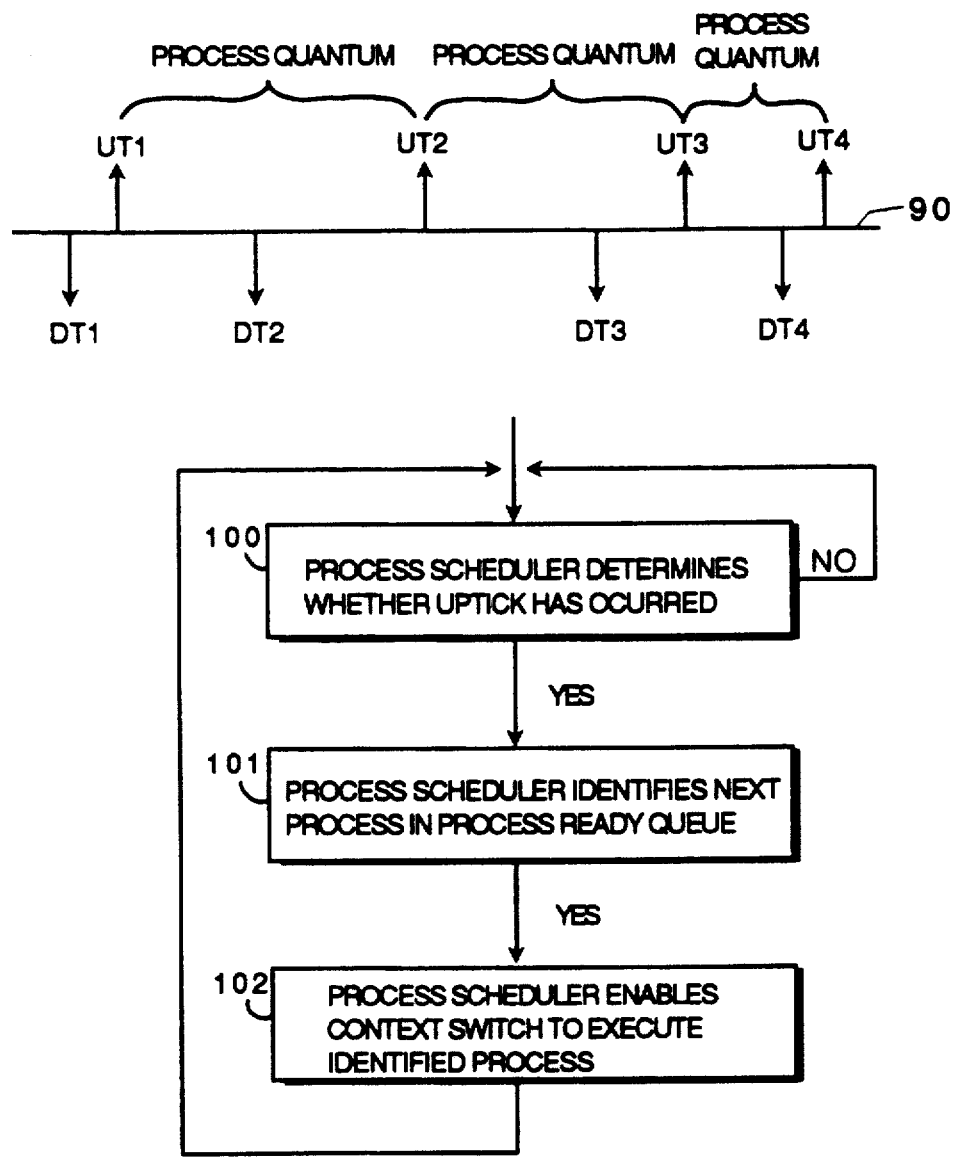
FIGS. 3A-1, 3A-2, 3B-2, 4A and 4B are flow diagrams illustrating the operation of the digital data processing system depicted in FIG. 1.

FIG. 2 depicts the operations of the process scheduler 14 in connection with scheduling processing of the various processes 11. FIG. 2 depicts, at the top, a time line 90 from which extends orthogonally upwardly a plurality of arrows, having the legends "UT1,"-"UT2,"(generally identified by "UTi") and so forth. The legends UTi represent successive generations by the tick selector 31 of the UP TICK indication. Similarly, time line 90 has a plurality of arrows extending downwardly therefrom and having the legends "DT1,""DT2,"(generally identified by "DTi"), which represent successive generations by the tick selector 31 of the DOWN TICK indication. As represented by the brackets in the intervals between successive UTi arrows, each of the intervals represents a "process quantum," that is, the time during which the process scheduler 14 permits a particular process 11 to be executed. Otherwise stated, on the generation of each of the UTi indications, the process scheduler 14 may, if the process ready queue identifies another process 11, initiate a context switch operation to facilitate processing of the next process identified in the process ready queue 15.

These operations are outlined in the flow chart at the bottom of FIG. 2. With reference thereto, the process scheduler continually monitors the UP TICK indication to determine whether the tick selector has generated an UP TICK indication (step 100). When the process generator determines that an UP TICK indication has occurred, it sequences to step 101 to identify the next process, after the one it is currently executing, in the process ready queue 15, and enables a context switch operation to enable the next process to be executed. The context switch operation is a conventional operation and will not be described further herein.

FIGS. 3A-1 through 3B-2 depict the operations of the request receiver 20 and input/output drivers 25 in connection with receipt of input/output requests from processes 11, and, if appropriate, buffering of input/output requests in staging buffers 28 and request buffers 23, and further in connection with transmitting the input/output requests to the respective input/output subsystems 12. In particular, FIGS. 3A-1 and 3A-2 generally depict operations of the request receiver 20 and drivers 25, respectively, in connection with requests to input/output subsystems, such as a network line interface, whose operation is externally observable, and FIGS. 3B-1 and 3B-2 generally depict operations of the request receiver 20 and drivers 25, respectively, in connection with requests to input/output subsystems 12, such as terminal devices and printers, whose interim progress is observable.

FIG. 3A-1 also includes a time line 109 having upwardly-directed arrows with the legends UTi ("i" is an integer) representing timing of UP TICK indications, and downwardly-directed arrows with the legends DTi ("i" is an integer), representing timing of DOWN TICK indications. Between the upwardly-directed arrows are a plurality of short vertical lines which represent timing of input/output requests from the various processes 11 directed to input/output subsystems 12, such as network line interfaces, whose operations are externally observable. Upon receipt by the request receiver 20, the input/output requests are placed in the staging buffers 28. As shown on the time line, at the UP TICK indications, the requests in the staging buffers 28 are moved to the request buffer 23, and output events, which correspond to the issuance by the input/output driver 25 of the input/output requests in the request buffers 23, are issued at each DOWN TICK indication for input/output requests received by the request receiver 20 and buffered since the last DOWN TICK indication.

FIGS. 3A-1 and 3A-2 depict flow charts detailing the operation of the request receiver 20 and drivers 25, respectively, in response to such a request. With reference to the flow chart on FIG. 3A-1, the request receiver 20 first receives an input/output request from a process 11 (step 110), and determines whether it is directed to an input/output subsystem 12 whose operation is externally observable (step 111). If so, it loads the request into the appropriate staging buffer 28, that is, the staging buffer 28 associated with the process 11 from which the input/output request was received (step 112). The request receiver 20 then determines whether the request was accompanied by data to be transmitted to the input/output subsystem 12 (step 113), and if so, loads the data into a system data buffer 24 (step 114). Thereafter, or following step 113 if the request receiver 20 determined there that no data accompanied the request, the request receiver may proceed to perform other processing operations.

With reference to FIG. 3A-2, in response to an UP TICK indication (step 115) a driver 25 that is associated with an input/output subsystem 12 whose operation is externally observable determines whether the staging buffers 28 contain any input/output requests for its associated input/output subsystem 12. If so, the driver 25 transfers the requests from the staging buffers 28 to the request buffer 23 (step 116). In response to a DOWN TICK indication (step 117), the driver determines whether the request buffer 23 contains any input/output requests for its associated input/output subsystem 12, and, if so, transmits those requests along with any accompanying data in the system data buffers 24, to the respective input/output subsystems 12.

Figure 3B:
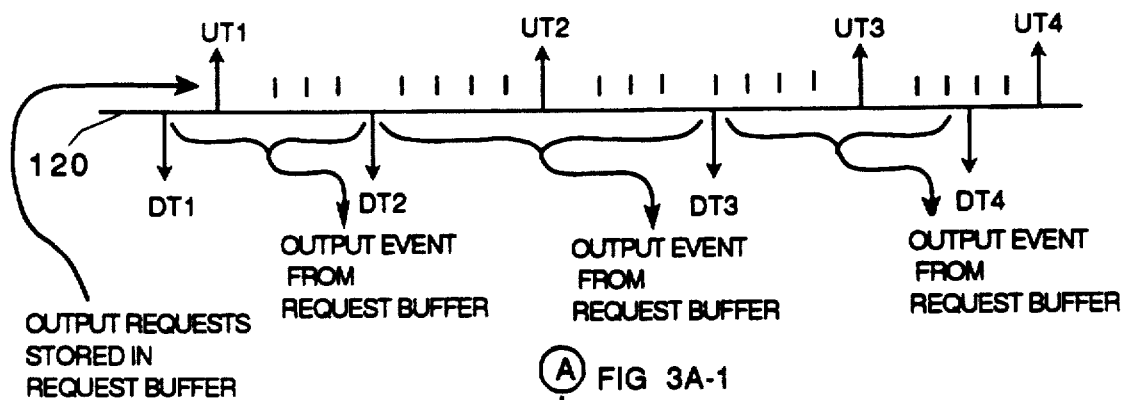
Figure 1:
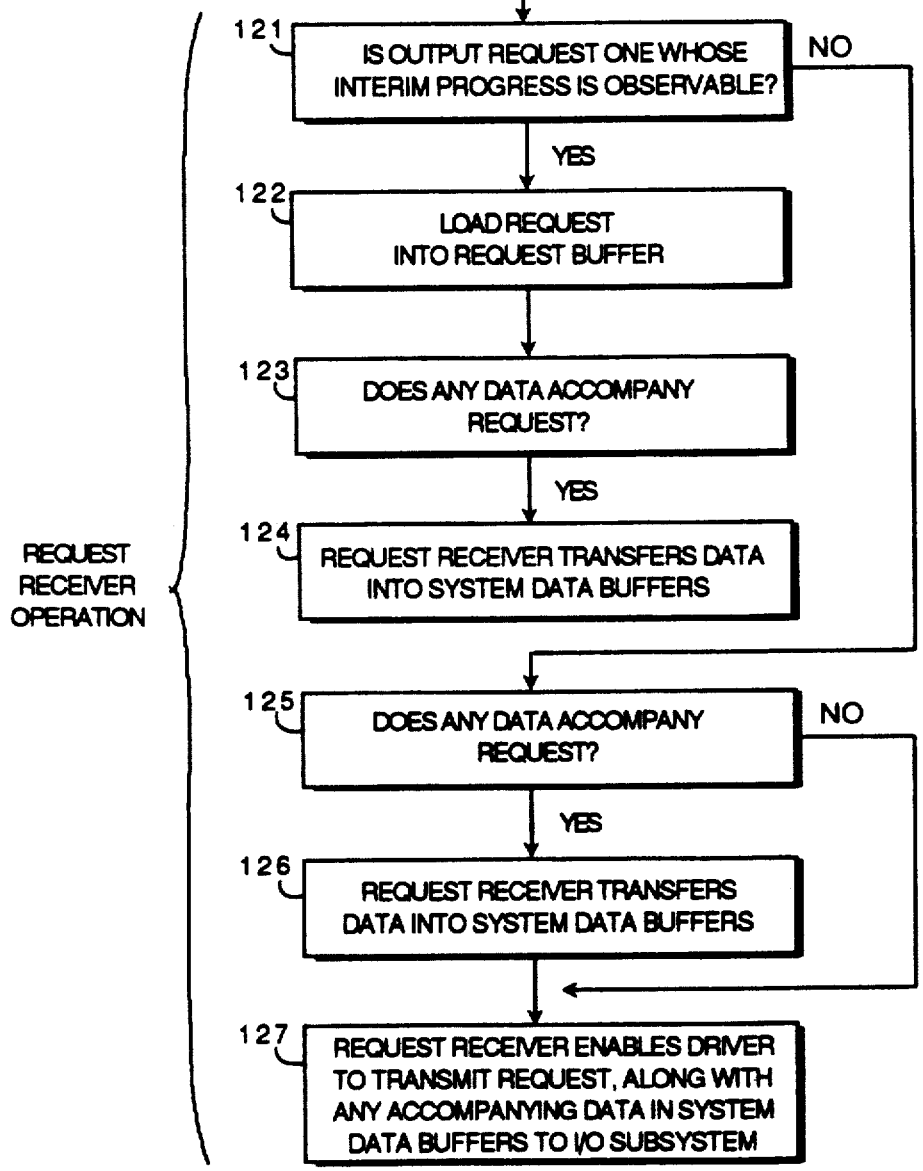
Figures 2, 3B:
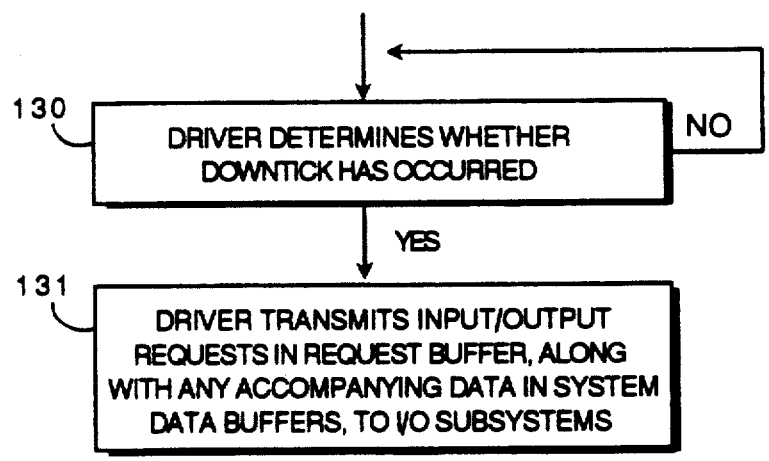

FIGS. 3B-1 and 3B-2 generally depict operations of the request receiver 20 and drivers 25, respectively, in connection with requests to input/output subsystems 12, such as terminal devices and printers, whose interim progress is observable. FIG. 3B-1 also includes a time line 120 having upwardly-directed arrows with the legends UTi ("i" is an integer) representing timing of UP TICK indications, and downwardly-directed arrows with the legends DTi ("i" is an integer), representing timing of DOWN TICK indications. Between the upwardly-directed arrows are a plurality of short vertical lines which represent timing of input/output requests from the various processes 11 directed to input/output subsystems 12, such as terminal devices or printers, whose interim progress is observable. Upon receipt by the request receiver 20, the input/output requests are placed in the request buffer 23. As shown on the time line, the input/output requests in the request buffers 23, are issued at each DOWN TICK indication for input/output requests received by the request receiver 20 and buffered since the last DOWN TICK indication.

FIGS. 3B-1 and 3B-2 depict flow charts detailing the operation of the request receiver 20 and drivers 25, respectively, in response to such a request. With reference initially to the flow chart on FIG. 3A-1, if the request receiver 20 determines, in step 111, that a request from a process 11 is not directed to an input/output subsystem 12 whose operation is externally observable (step 111), it sequences to step 121 on FIG. 3B-1. In step 121, the request receiver determines whether the input/output request is directed to an input/output subsystem whose interim progress is observable. If so, it loads the request into the request buffer 23 (step 122). The request receiver 20 then determines whether the request was accompanied by data to be transmitted to the input/output subsystem 12 (step 123), and if so, loads the data into a system data buffer 24 (step 124). Thereafter, or following step 123 if the request receiver 20 determined there that no data accompanied the request, the request receiver may proceed to perform other processing operations.

Returning to step 121, if the request receiver 20 determines that the request is not directed to an input/output subsystem 12 whose interim progress is observable, the request receiver sequences to a series of steps 125 through 127 in which it transfers the request to an appropriate driver 25 for transmission to the input/output subsystem. In that case, the input/output request is directed to, for example, a mass storage subsystem, whose operation is not externally observable and whose interim progress is not observable. In step 125, the request receiver determines whether any data accompanies the request, and, if so, it transfers the data from the process's process buffer 22 to the system data buffers 24 (step 126). The request receiver 20 then enables the appropriate driver 25 to transmit the request, along with any accompanying data in the system data buffers 24, to the input/output subsystem 12 for execution. Thereafter, the request receiver 20 may proceed to perform other processing operations.

With reference to FIG. 3B-2, in response to a DOWN TICK indication (step 130) a driver 25 that is associated with an input/output subsystem whose interim progress is observable determines whether the request buffer 23 contains any input/output requests for its associated input/output subsystem. If so, the driver 25 transmits those requests, along with any accompanying data in the system data buffers 24, to the respective input/output subsystems 12 (step 131).

Figure 4A:
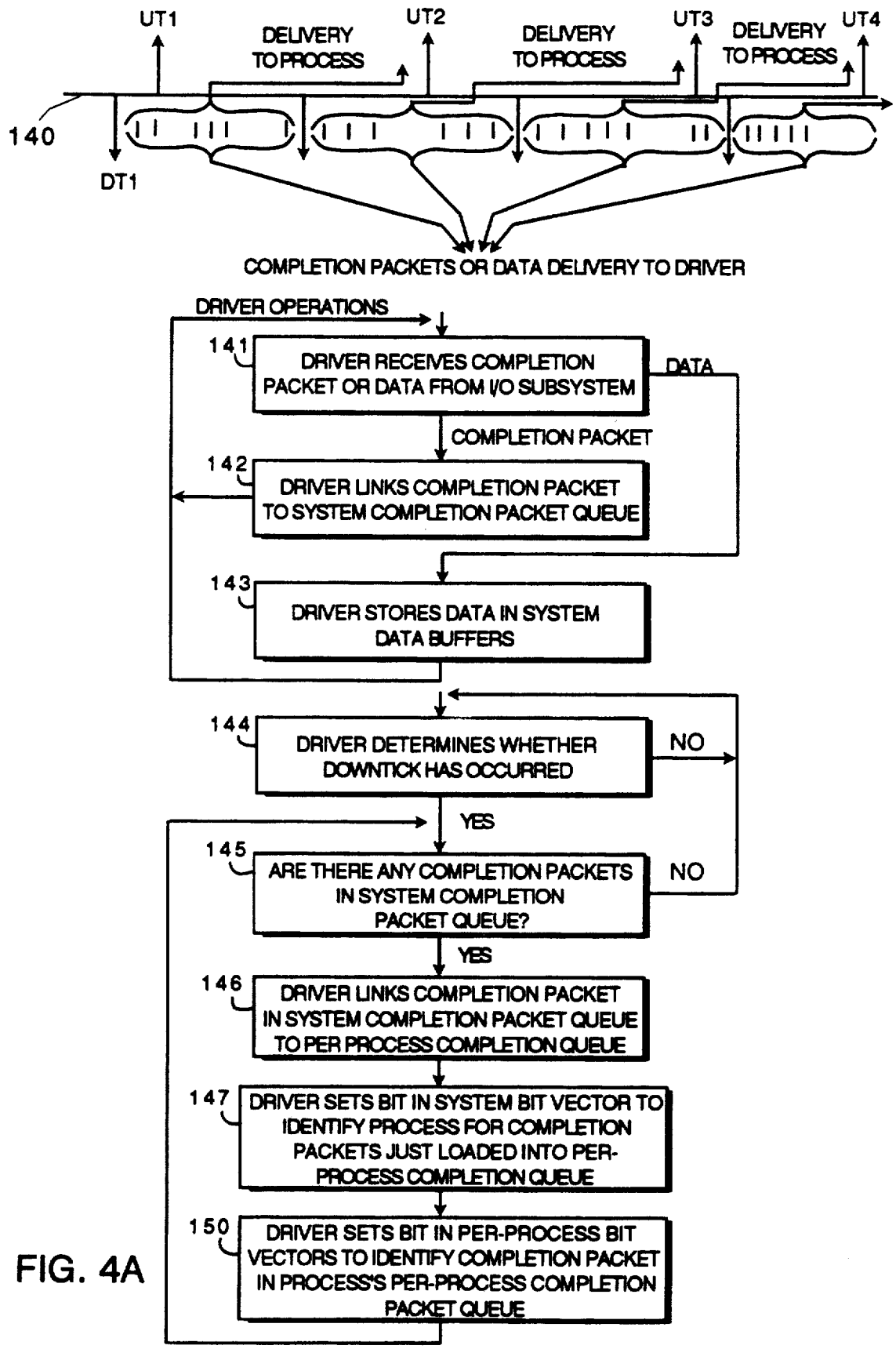
Figure 4B:
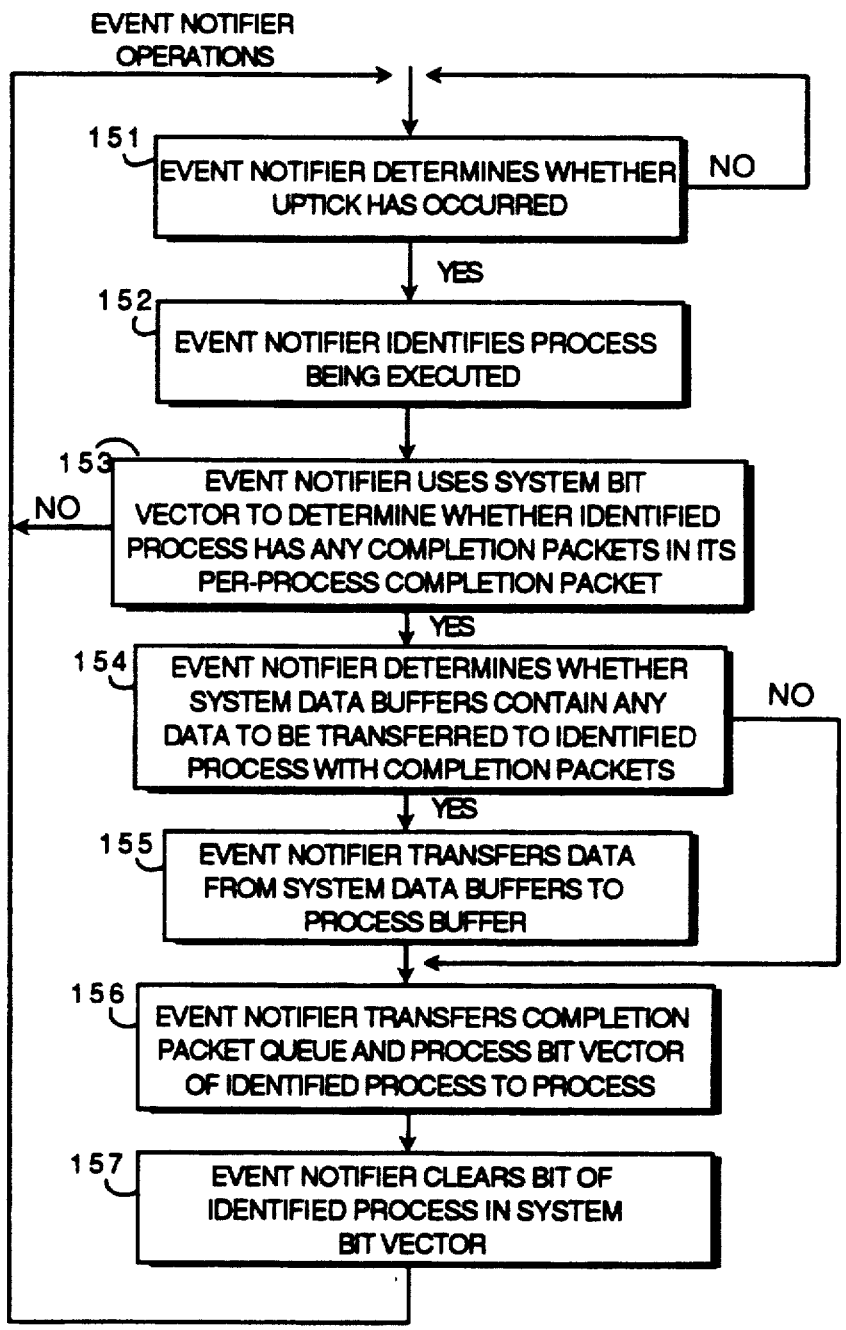

FIGS. 4A and 4B depict the operations of the input/output drivers 25 and event notifier 27 in connection with receipt of completion packets and data, which have been buffered in the system completion packet queue 26 and system data buffers 24, respectively, to the respective processes 11. FIG. 4A also includes a time line 140 having upwardly-directed arrows with the legends UTi ("i" is an integer) representing timing of UP TICK indications, and downwardly-directed arrows with the legends DTi("i" is an integer), representing timing of DOWN TICK indications. Between the downwardly-directed arrows are a plurality of short vertical lines which represent timing of receipt of interrupts, by the input/output drivers 25, in response to the completions by the input/output subsystems 12 of the input/output requests from the various processes 11. As shown in the time line, the event notifier reports completion packets and data at each UP TICK indication for completion packets received by the input/output drivers 25 and queued in the system completion packet queue 26 prior to the last previous DOWN TICK indication.

The flow chart below time line 140 on FIG. 4A depicts the operations of the input/output driver 25 upon receipt of completion packets and data and the flow chart on FIG. 4B depicts the operations of the event notifier 27 in connection with reporting them to processes 11. When an input/output driver 25 receives a completion packet or data from an input/output subsystem 12, it first determines whether it has received a completion packet or data (step 141). If it has received a completion packet, it enqueues the completion packet onto the system completion packet queue 26 (step 142) and returns to step 141. On the other hand, if the driver determines, in step 141, that it has received data, it stores the data in a system data buffer 24 (step 143) identified by the input/output subsystem 12, and returns to step 141. The input/output driver 25 continually performs steps 141 through 143, loading completion packets onto the system completion packet queue 26 and data into specified data buffers 24, until it receives a DOWN TICK indication from the timer 16.

In response to a DOWN TICK indication, the input/output driver 25 iteratively performs a sequence defined by steps 144 through 150 to iteratively link completion packets that it has received from the system completion packet queue 26 to the per-process completion packet queues 52 and to condition the appropriate bits in the completion bit vector 50 and the per-process bit vectors 51. When a DOWN TICK indication occurs (step 144), the input/output driver 25 initially determines whether the system completion packet queue 26 contains any completion packets (step 145). If not, it returns to step 144 to wait for the next DOWN TICK indication.

If, however, the input/output driver determines that the system completion packet queue 26 contains a completion packet, it sequences to step 146 to unlink the completion packet from the system completion packet queue 26 and link it to the completion packet queue, in the per-process completion packet queues 52, of the process to receive the completion packet, which is identified in the completion packet. The driver 25 then sets the process's bit in the completion bit vector 50 (step 147), and sets a bit in the process's per-process bit vector 51 to identify the type of operation for which the completion packet is a response (step 150). The driver then returns to step 145 to determine if there is another completion packet in the system completion packet queue 26. The input/output driver 25 thus iteratively performs steps 145 through 150 in connection with each of the completion packets in the system completion packet queue 26, after which it terminates processing of the system completion packet queue 26 and returns to step 144 to await the next DOWN TICK indication.

The operations performed by the event notifier 27 of each processor in notifying processes 11 processed by the processor of the receipt of completion packets are depicted in FIG. 4B. With reference to FIG. 4B, in response to an UP TICK indication (step 151), the event notifier first identifies the process 11 that is then being processed (step 152). The event notifier 27 notifies only the process 11 that the system 10 is then processing of the receipt of completion packets. After identifying the process 11 that the system 10 is then processing, the event notifier determines, from the process's associated bit in the completion bit vector 50, whether the process's completion packet queue in per-process completion packet queues 52 is empty, that is, whether or not the process's completion packet queue has any completion packets to deliver. If not, the event notifier 27 returns to step 151 to wait for the next UP TICK indication.

On the other hand, if, in step 153, the event notifier 27 determines that the completion bit vector 50 indicates that the completion packet queue, in queues 52, associated with the process 11 being processed by system 10, does contain one or more completion packets, it determines whether the system data buffers 24 contain any data to be transferred to the process's process buffer 22 (step 154), and, if so, it transfers the data to the process buffer 22 (step 155). In this operation, the event notifier may iteratively step through the completion packets in the process's completion packet queue, and if it identifies one with a pointer to a buffer in system data buffers 24, it may transfer the data to the process's process buffer 22.

The event notifier 27, following step 155, or step 154 if the system data buffer does not contain any data to be transferred, sequences to step 156, in which it transfers the process's completion packet queue and the process's bit vector from perprocess bit vectors 51, to the process 11, and clears the process's bit in the completion bit vector 50 (step 157) and the per-process bit vector 51(i) corresponding to the process 11(i). The event notifier then returns to step 151 to await the next UP TICK indication.

It will be appreciated that the invention provides a number of advantages in reducing the bandwidth of covert timing channels which may exist in a digital computer system. The reduction in the precision of the system time value which may be provided to a process, and the unpredictable amount of time a process may be executed reduces the ability of a process 11 to determine timing intervals with any precision. In addition, since input/output operations, as initiated by the input/output subsystem interface 17 and performed by the input/output subsystems 12, are timed separately and independently of the timing of the input/output requests and notifications from the processes 11, in response to the DOWN TICK and UP TICK indications, the ability of the processes to determine timing intervals with any precision therefrom is also reduced.

It will be appreciated that synchronizing transmission of input/output requests to all input/output subsystems 12 and their respective input/output devices (such as the individual disk and tape units, for example), using a single series of DOWN TICK indications, may enable a Trojan horse and spy process to transfer information by comparing completion times of the input/output requests. This may be obviated by providing a distinct series of DOWN TICK indications for each individual device in each input/output subsystem 12, with the DOWN TICK indications in each series occurring at unpredictable times with respect to DOWN TICK indications in the other series.

It will be further appreciated that the various elements depicted on FIG. 1, in particular the processes 11 and operating system 13, may comprise special-purpose hardware, or they may comprise a programmed computer system.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital computer system for processing a process, said system comprising
 a timing indication generator that generates timing indications of a first type and timing indications of a second type, the timing indications of the first type being separated from the timing indications of the second type by intervals of random duration that are unpredictable to the process, first and second service providers for providing services to said process, said process interacting with each of said service providers, means responsive to a timing indication of the first type for scheduling the occurrence of an event of a first kind relating to the interactions between said process and said first service provider, wherein said first service provider generates a first signal indicating occurrence of an event of a first kind, means responsive to said first signal and to occurrence of a timing indication of the second type for scheduling the occurrence of an event of a second kind relating to the interactions between said process and said second service provider, wherein said second service provider generates a second signal sufficient to indicate the occurrence of said event of a second kind, said second signal being unknown to said process, and means responsive to said second signal and to said timing indications of the first type for indicating to said process the occurrence of said event of a second kind.

2. The computer system of claim 1 wherein said means responsive to a timing indication of said first type comprises a process scheduler responsive to said timing indication of said first type to schedule the initiation of processing of said process, and said means responsive to said first signal and to the occurrence of a timing indication of the second type comprises a request processor for responding to requests from said process, said request processor delaying events relating to said requests until the occurrence of timing indications of the second type.

3. The computer system of claim 2 wherein said request processor is an IO interface and said requests are for IO operations.

4. The computer system of claim 3, wherein said IO interface delays said requests for IO operations in response to timing indications of said second type.

5. The computer system of claim 4, wherein said IO interface delays requests for ones of said IO operations having observable interim progress until an occurrence of a timing indication of said second type.

6. The computer system of claim 10, wherein said IO interface further includes a request buffer for buffering said IO operation requests from said process, said request buffer being responsive to said timing indications of said second type.

7. The computer system of claim 5, wherein said IO interface delays until an occurrence of a timing indication of said second type requests for ones of said IO operations whose interim progress is observable by reqeusting further IO operations.

8. The computer system of claim 7, wherein said IO interface delays until an occurrence of a timing indication of said second type requests for ones of said IO operations that render the progress of other IO operations observable.

9. The computer system of claim 3, wherein said IO interface buffers said requests for IO operations in response to timing indications of said second type.

10. The computer system of claim 3, wherein requests for ones of said IO operations that are externally observable as occurring between two successive timing indications of said first type are delayed until an occurrence of a timing indication of said second type.

11. The computer system of claim 10, said IO interface further including a staging buffer for buffering said IO operation requests, said staging buffer being responsive to said timing indications of said first type, and a request buffer responsive to said timing indications of said second type and to said staging buffer to receive and buffer requests previously buffered in said staging buffer.

12. The computer system of claim 3, wherein events relating to ones o said IO operations whose interim progress is unobservable and that are not externally observable are allowed to proceed unbuffered.

13. The computer system of claim 3, wherein said IO interface buffers the notifications of events related to said IO operations in response to timing indications of said second type.

14. The computer system of claim 13, said IO interface further including a system completion packet queue for storing completion packets generated when said IO operations are completed, a per-process completion packet queue responsive to timing indications of said second type and to said system completion packet queue to receive said completion packets from said system completion packet queue, and an event notifier responsive to said per-process queue and to timing indications of said second type, for notifying said process of the presence of completion packets in said per-process queue in response to a timing indication of said second type.

15. The computer system of claim 3, further including ring buffers for buffering said requests for said IO operations in response to timing indications of said second type.

16. The computer system of claim 1 or 2 wherein said timing indication generator also generates a system time value, said system time value being a running indication of time that is available to said process, and further including means responsive to said timing indication generator for providing a representation of said value that is less accurate than said value.

17. The computer system of claim 16, wherein the representation of said value that is less accurate than said value is computed by truncating said value.

18. The computer system of claim 16, wherein said representation is updated only in response to timing indications of said second type.

19. The computer system of claim 1 or 2 wherein said timing indication generator comprises a timer.

20. The computer system of claim 2 wherein said timing indications of the first and second types are generated in an alternating manner.

21. The computer system of claim 2 further including a further timing indication generator for generating a further series of timing indications.

22. The computer system of claim 21 wherein said further timing indication generator is within an IO device.

23. The computer system of claim 21 further including a plurality of processors and wherein separate timing indication generators are associated with separate processors.

24. The computer system of claim 21 wherein said further timing indication generator generates timing indications of said second type.

25. The computer system of claim 1 or 2 wherein said timing indication generator includes
a tick counter for counting timing signals and for generating one of said timing indications when said tick counter has counted out, and
an unpredictable number store for re-loading said tick counter when said tick counter has counted out.

26. The computer system of claim 25, wherein each unpredictable number that is loaded from said unpredictable number store into said tick counter is also added to a system time value in response to said timing indications.

27. The computer of claim 25, further including a timing source for generating said timing signals.

28. The computer system of claim 2 wherein said timing indication generator includes
a tick counter for counting timing signals and for generating one of said timing indications when said tick counter has counted out,
an unpredictable number store for re-loading said tick counter when said tick counter has counted out, and
a tick selector responsive to timing indications from said tick counter for generating said first and second types of timing indications.

29. The computer of claim 28, further including a timing source for generating said timing signals.

30. A digital computer system comprising:
a timing indication generator that generates timing indications of a first type and timing indications of a second type, the timing indications of the first type being separated from the timing indications of the second type by intervals of random durations that are unpredictable to a process, and
an IO interface responsive to said timing indications of said first type and to said timing indications of said second type, for processing requests for IO operations, said IO interface buffering said request for IO operations in response to said timing indications of said second type, and buffering notifications of events related to said processing of said requests for IO operations in response to (a) said timing indications of said first type, (b) said requests for IO operations, and (c) said events related to said processing of said requests for IO operations.

31. The computer system of claim 30, wherein events relating to ones of said IO operations being unobservable are allowed to proceed unbuffered.

32. A method of interfacing a service requestor and a resource allocator to restrict information flow therebetween, said method including the steps of
generating timing indications of a first type and timing indications of a second type, the timing indications of the first type being separated from the timing indications of the second type by intervals of random durations that are unpredictable to the service requestor,
selectively passing the generated timing indications of the first type to the service requestor, and
generating a request to said resource allocator in response to said timing indications of said first type,
generator a response to said service requestor in response to said request from said service requestor, and
transferring said response to said service requestor in response to said response of said resource allocator and to an occurrence of a timing indication of said second type from the timing indication generator.

33. The method of claim 32 wherein said service requestor is a process, and further including the step of using said provided timing indications of said second type to schedule the initiation of processing of said process.

34. The method of claim 32 further including the step of providing the process with an imprecise representation of absolute time.

35. The method of claim 32 wherein said step of generating said timing indications includes counting timing signals to generate a timing indication of one of said first and second types when a certain count is achieved, and restarting the count with a number that is unpredictable by said process.

36. An interface for restricting information flow between a service requestor and a resource allocator, said interface including
a timing indication generator that generates timing indications of a first type and timing indications of a second type, the timing indications of the first type being separated from the timing indications of the second type by intervals of random durations that are unpredictable to the service requestor,
means responsive to said timing indication generator for selectively passing said timing indications of said first type to said service requestor,
means in said service requestor responsive to said timing indications of said first type for generating a request to said resource allocator.
means in said resource allocator responsive to said request from said service requestor for generating a response to said service requestor,
means responsive to said responsive of said resource allocator and to an occurrence of a timing indication of said second type from the timing indication generator for transferring said response to said service requestor.

37. The interface of claim 36 wherein said resource allocator is a process scheduler and wherein said service requestor is a process.

38. The interface of claim 36 wherein said service requestor comprises a process and wherein said resource allocator comprises an IO interface for receiving requests from said process, said IO interface being responsive to said timing indication generator to schedule events associated with said IO interface.

39. A digital computer system for processing a plurality of processes, said system comprising
a timing indication generator that generates two types of timing indications that are unpredictable to the processes, said generator also generating a running time value available to said processes, said timing indication generator comprising a tick counter for counting timing signals and for generating one of said timing indications when said tick counter has counted out, and an unpredictable number store means for re-loading said tick counter with a random number when said tick counter has counted out,
means responsive to said timing indication generator for providing a partial representation of said running time value for use in the execution of the processes that is less accurate than said running time value,
a scheduler responsive to the timing indications of a first one of said types for scheduling context switches between execution of respective said processes, and
a request processor that responds to requests resulting from execution of said processes, and delays execution of events relating to said requests, until the occurrence of timing indications of the second of said types.

* * * * *

UNITED STATES PATENT AND TRADEMARK OFFICE
CERTIFICATE OF CORRECTION

PATENT NO. : 5,220,661

DATED : June 15, 1993

INVENTOR(S) : Wei-Ming Hu, Clifford E. Kahn, Paul A. Karger, Andrew H. Mason, Paul T. Robinson, John C. R. Wray It is certified that error appears in the above-identified patent and that said Letters Patent is hereby corrected as shown below:

On title page, item [56] References Cited, Other Publications, add:

Loepere K., "The Covert Channel Limiter Revisited", Operating Systems Review, Vol. 23, No. 2, April 1989, New York, pp. 39-44

Schaefer M. et al., "Program Confinement in KVM/370", Proceedings of the 1977 ACM Annual Conference, October 16, 1977, Seattl, Washington, pp. 404-410

Col. 1, line 68, "process" should be --processes--.

Col. 2, line 46, "process" should be --processor--.

Col. 5, line 19, "FIGS. 3A-1, 3A-2,..." should be --FIGS 2, 3A-1, 3A-2,..."

Col. 9, line 32, "1" should be --11--.

Col. 9, line 35, insert --a-- after "of".

Col. 9, line 63, insert --is-- after "as".

UNITED STATES PATENT AND TRADEMARK OFFICE
CERTIFICATE OF CORRECTION

PATENT NO. : 5,220,661
DATED : June 15, 1993
INVENTOR(S) : Wei-Ming Hu, Clifford E. Kahn, Paul A. Karger, Andrew H. Mason, Paul T. Robinson, John C. R. Sray It is certified that error appears in the above-indentified patent and that said Letters Patent is hereby corrected as shown below:

Col. 11, line 2, "rom" should be —from—.

Signed and Sealed this

Sixteenth Day of May, 1995

Attest:

BRUCE LEHMAN

Attesting Officer

Commissioner of Patents and Trademarks